United States Patent
Kamata et al.

(10) Patent No.: US 8,115,458 B2
(45) Date of Patent: Feb. 14, 2012

(54) DRIVER

(75) Inventors: Yuki Kamata, Fujisawa (JP); Hiroshi Masumoto, Yokohama (JP); Hiroshi Nagai, Fukaya (JP); Sadao Ikeda, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 12/723,874

(22) Filed: Mar. 15, 2010

(65) Prior Publication Data

US 2011/0089912 A1    Apr. 21, 2011

(30) Foreign Application Priority Data

Oct. 15, 2009 (JP) .................. 2009-238482

(51) Int. Cl.
*G05F 1/70* (2006.01)
*G05F 5/02* (2006.01)

(52) U.S. Cl. ....................................... 323/207

(58) Field of Classification Search .......... 323/205, 323/207; 363/34, 36, 40, 44, 78, 79, 80, 363/84, 89, 95
See application file for complete search history.

(56) References Cited

U.S. PATENT DOCUMENTS

| | | | | |
|---|---|---|---|---|
| 4,788,485 A * | 11/1988 | Kawagishi et al. | ........... | 318/811 |
| 4,843,533 A * | 6/1989 | Roof et al. | ........... | 363/55 |
| 5,712,540 A * | 1/1998 | Toda et al. | ........... | 318/46 |
| 5,793,623 A * | 8/1998 | Kawashima et al. | ........... | 363/56.05 |
| 6,567,283 B2 * | 5/2003 | Welches | ........... | 363/89 |
| 6,781,352 B2 | 8/2004 | Athari et al. | | |
| 7,068,016 B2 | 6/2006 | Athari | | |
| 7,164,590 B2 * | 1/2007 | Li et al. | ........... | 363/40 |

FOREIGN PATENT DOCUMENTS

| | | |
|---|---|---|
| JP | 10-201248 | 7/1998 |
| JP | 2001-037254 | 2/2001 |
| JP | 2006-510340 | 3/2006 |
| JP | 2008-211881 | 9/2008 |

* cited by examiner

*Primary Examiner* — Gary L Laxton
(74) *Attorney, Agent, or Firm* — Turocy & Watson, LLP

(57) ABSTRACT

A driver includes a sensor sensing a driving current and a driving voltage for an external device including a capacitor, a PWM, a PFC, and a controller. The PFC includes a phase angle estimation unit estimating a phase angle variation of an input voltage to the PFC based on a parameter regarding the driving current, a voltage compensator compensating an error of the driving voltage, a first current estimation unit estimating a variation of a charge of the capacitor based on the charge current and the phase angle variation estimated by the phase angle estimation unit, a second current estimation unit estimating a driving current variation, and a calculator calculating a duty ratio for the PWM based on the variation of the charge current estimated by the first current estimation unit and the driving current variation estimated by the second current estimation unit.

14 Claims, 4 Drawing Sheets

DRIVER

CROSS-REFERENCE TO RELATED APPLICATION

This application is based upon and claims the benefit of priority from the prior Japanese Patent Application No. 2009-238482, filed on Oct. 15, 2009; the entire contents of which are incorporated herein by reference.

BACKGROUND OF THE INVENTION

1. Field of the Invention

The present invention relates to a driver that drives an external device such as a motor.

2. Related Art

In a conventional technology that improves a power factor of the external device such as the motor, PFC (Power Factor Corrector) has been used. Ordinary PFC has adjusted a waveform of a current (hereinafter referred to as "charge current") so as to have a waveform similar to a waveform of a driving voltage for the external device in order to improve the power factor.

However, conventional PFC (see JP-A 2006-510340 (Kokai), JP-A 2001-37254 (Kokai), JP-A H10-201248 (Kokai), and "Correcting Power Factor-Saving Cost using Digital Control- (pages 44-48, EE Times Japan April issue in 2009, on Apr. 17, 2009)") has required a signal pass to sense the driving voltage or a driving current. Therefore, the number of elements included in the PFC has been increased. That is, a special sensor for the PFC has been required. As a result, a circuit area and a consumed power of the PFC have been increased. Therefore, a cost of manufacturing the PFC has been increased.

BRIEF SUMMARY OF THE INVENTION

According to one aspect of the present invention, there is provided a driver comprising:

a sensor configured to sense a driving current and a driving voltage for an external device comprising a capacitor;

a pulse width modulator configured to supply a pulse signal to the external device;

a power factor corrector comprising a phase angle estimation unit configured to estimate a phase angle variation of an input voltage to the power factor corrector based on a parameter regarding the driving current, a voltage compensator configured to compensate an error of the driving voltage, a first current estimation unit configured to estimate a variation of a charge current flowing to the capacitor based on the charge current for compensating the error by the voltage compensator and the phase angle variation estimated by the phase angle estimation unit, a second current estimation unit configured to estimate a driving current variation, and a calculator configured to calculate a duty ratio for the pulse width modulator based on the variation of the charge current estimated by the first current estimation unit and the driving current variation estimated by the second current estimation unit; and a controller configured to control the driving current for the external device and to generate the parameter based on the driving current and the driving voltage sensed by the sensor.

DETAILED DESCRIPTION OF THE INVENTION

An embodiment of the present invention will be described with reference to the accompanying drawings.

Figure 1:
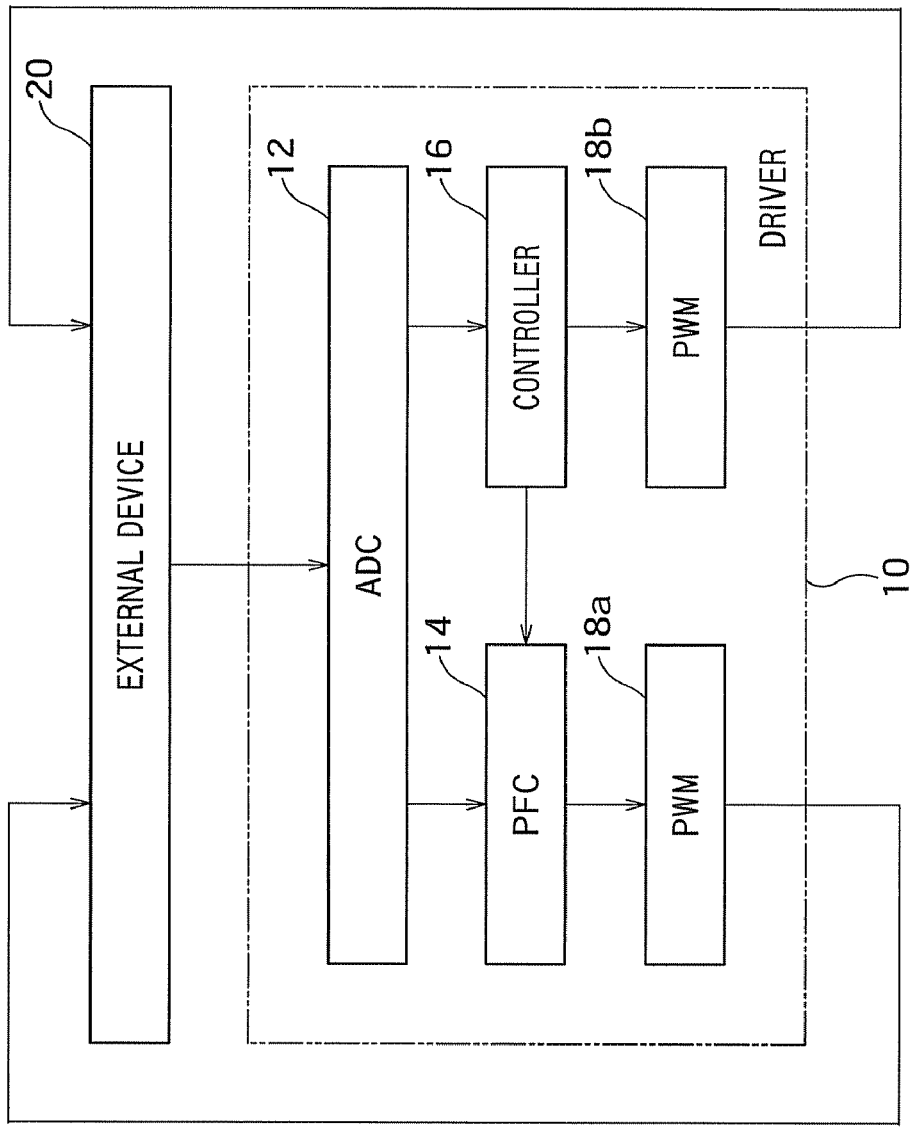
FIG. 1 is a block diagram showing a rough configuration of a driver of an embodiment of the present invention.
Figure 2:
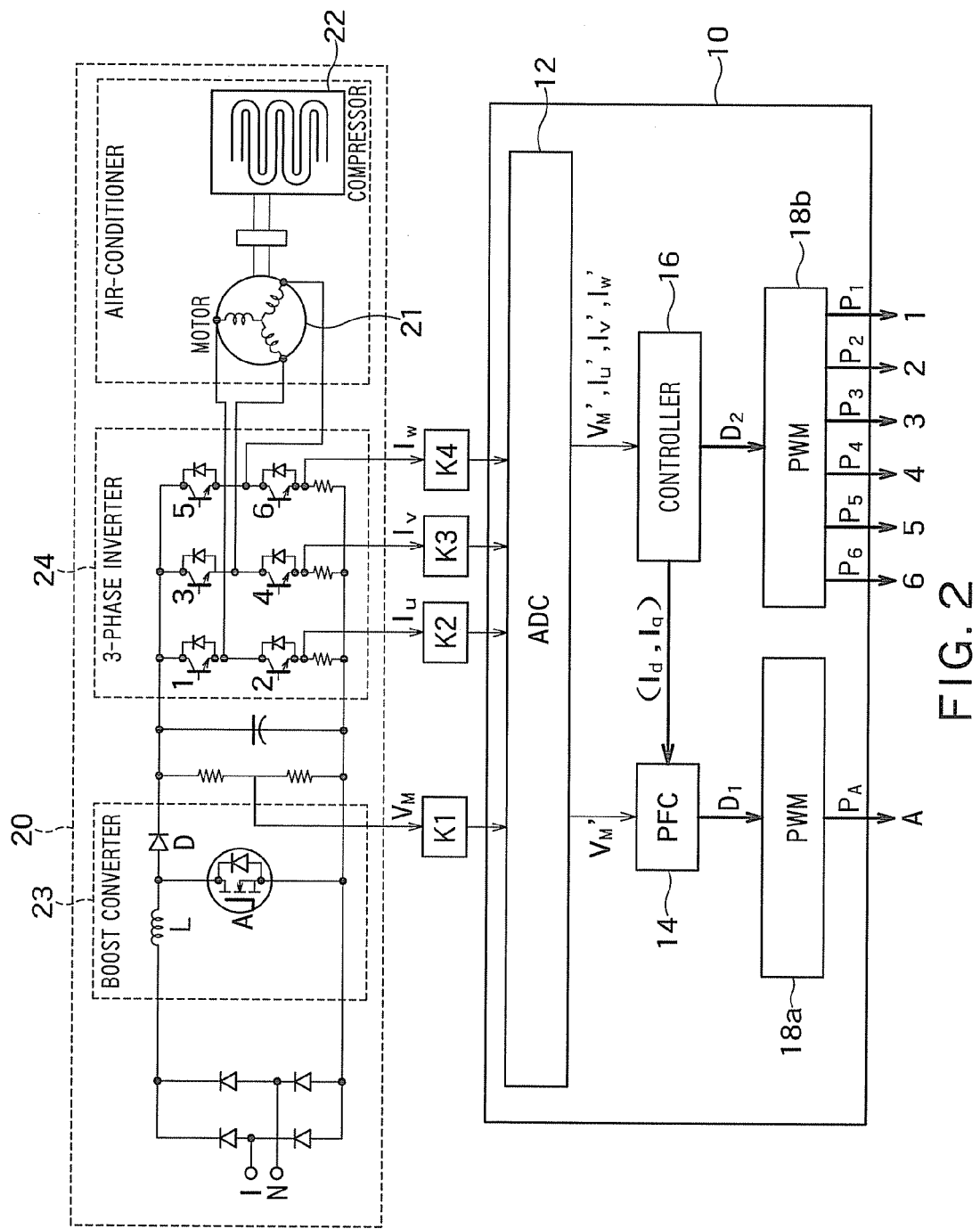
FIG. 2 is a block diagram showing an example of a configuration of the driver 10 and the external device 20 of FIG. 1.
Figure 3:
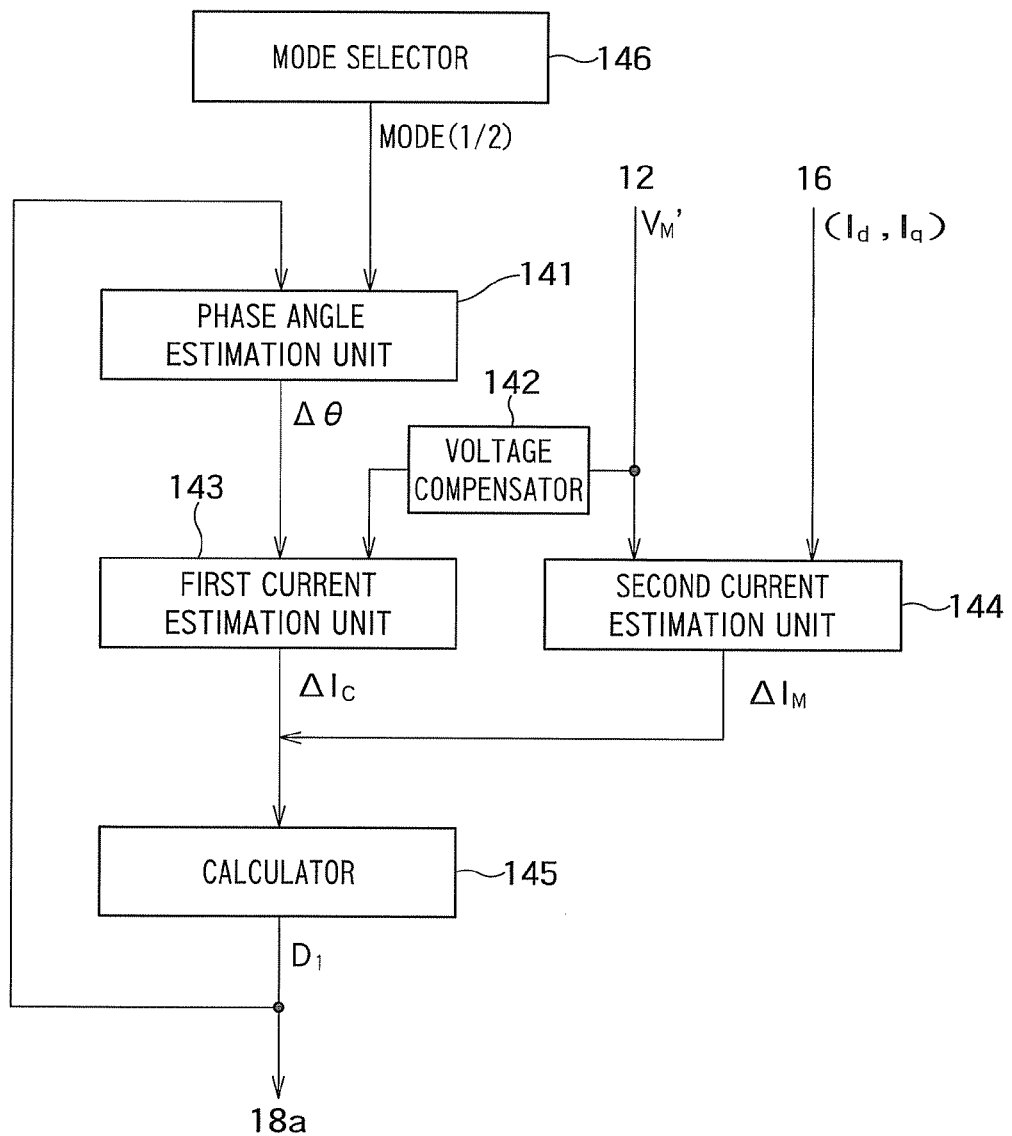
FIG. 3 is a block diagram showing a rough configuration of PFC 14 of FIG. 1.
Figure 4:
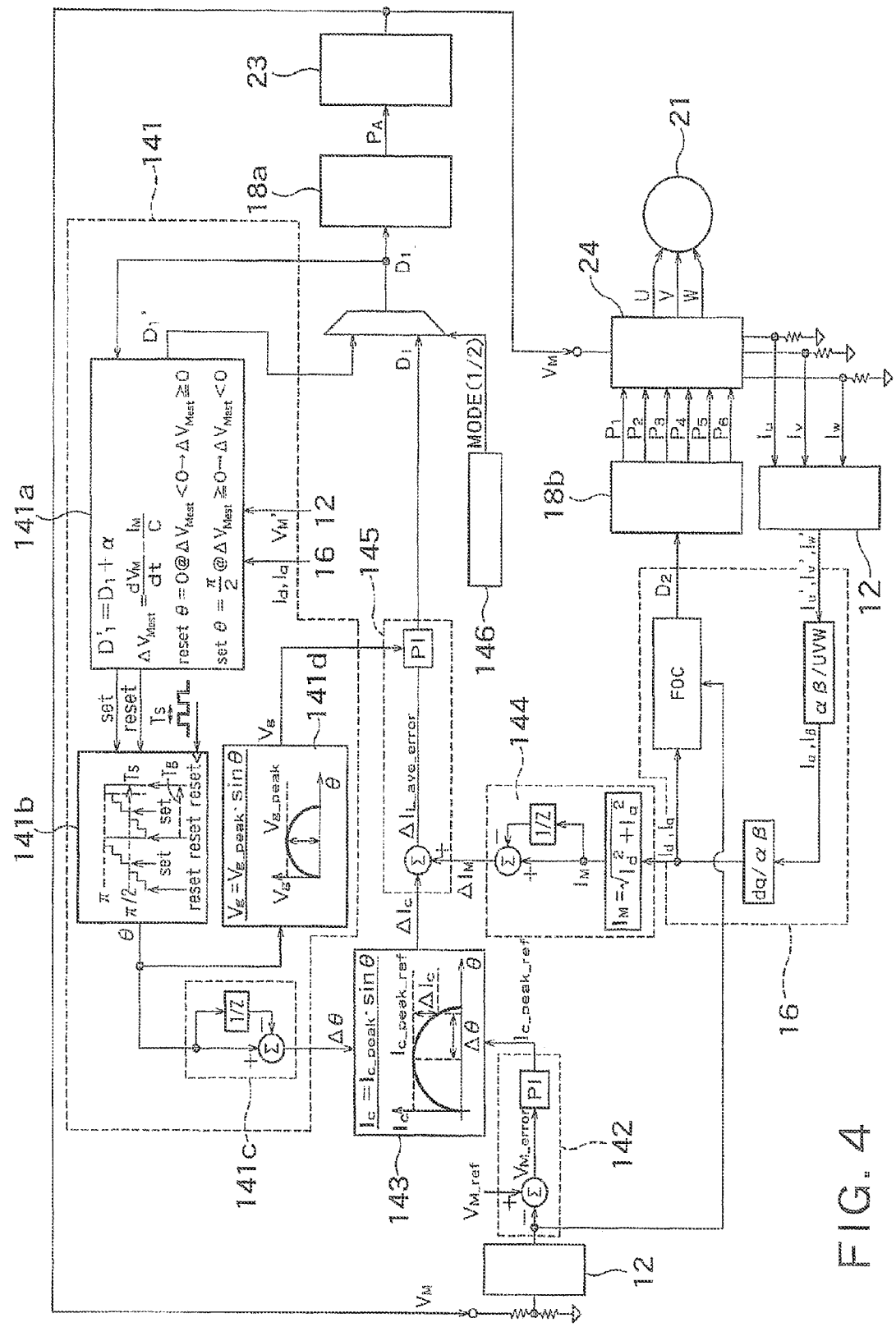
FIG. 4 is a circuit diagram of the driver 10 of FIG. 1.

A configuration of a driver according to the embodiment will be described. FIG. 1 is a block diagram showing a rough configuration of a driver of an embodiment of the present invention. FIG. 2 is a block diagram showing an example of a configuration of the driver 10 and the external device 20 of FIG. 1. FIG. 3 is a block diagram showing a rough configuration of PFC 14 of FIG. 1. FIG. 4 is a circuit diagram of the driver 10 of FIG. 1.

The configuration of the driver according to the embodiment will be described referring to FIG. 1.

A driver 10 according to the embodiment is connected to an external device 20 that performs a predetermined operation. Furthermore, the driver 10 includes ADC (analog to digital converter) 12, PFC 14, a controller 16, PWMs (Pulse Width Modulator) 18a and 18b. The ADC 12 is configured to operate as a sensor that senses a driving current and a driving voltage for the external device 20. The PFC 14 is configured to calculate a duty ratio for the PWM 18a in order to improve a power factor of the external device 20. The controller 16 is configured to control the driving current for the external device 20 based on the driving current and the driving voltage sensed by the ADC 12, and to supply a parameter for the driving current to the PFC 14. The PWM 18a is configured to modulate a pulse width of a signal supplied from the ADC 12 by using the duty ratio calculated by the PFC 14 and to supply a pulse signal having a modulated pulse width to the external device 20. The PWM 18b is configured to modulate a pulse width of a signal output from the controller 16 by using a predetermined duty ratio and to supply a pulse signal having a modulated pulse width to the external device 20.

An example of the configuration of the driver 10 and the external device 20 of FIG. 1 will be described referring to FIG. 2.

The external device 20 includes an air conditioner having a motor 21 and a compressor 22, a boost converter 23, and a 3-phase converter 24. In addition, in the embodiment, the external device 20 is not limited to the air conditioner. For example, the external device 20 may be a fan such as ceiling fan or air fan.

A current is supplied to terminals I and N of the external device 20. The boost converter 23 and the 3-phase converter 24 are configured to generate a power based on the current supplied to the terminals I and N, and to supply the power to the motor 21. The motor 21 is configured to drive based on the current supplied from the boost converter 23 and the 3-phase converter 24. Furthermore, the external device 20 is configured to supply the driving voltage $V_M$ and shunt currents $I_U$, $I_V$, and $I_W$ to the ADC 12. In addition, in the embodiment, a topology of the external device 20 is not limited to a boost. For example, the topology of the external device 20 may be a buck or a boost and back.

The ADC 12 is configured to convert the driving voltage $V_M$ and the shunt currents $I_U$, $I_V$, and $I_W$ to digital signals $V_M{}'$, $I_U{}'$, $I_V{}'$, and $I_W{}'$, and to supply the digital signals $V_M{}'$, $I_U{}'$, $I_V{}'$, and $I_W{}'$ to the PFC 14 and the controller 16. That is, the ADC 12 operates as the sensor that employs a three shunts system, and senses the driving current $I_M$, and the driving voltage $V_M$ of the external device 20 in order to supply the digital signals $V_M'$, $I_U'$, $I_V'$, and $I_W'$ to the PFC 14 and the controller 16.

The controller 16 is configured to perform operations. In a first operation, the controller 16 estimates a position of the motor 21 based on the digital signals $V_M'$, $I_U'$, $I_V'$, and $I_W'$ supplied from the ADC 12 and determines a voltage $V_{DC}$ applied to the motor 21. In a second operation, the controller 16 calculates a duty ratio $D_2$ and supply the duty ratio $D_2$ to the PWM 18b. In a third operation, the controller 16 supplies a parameter (current vector $(I_d, I_q)$) for the driving current $I_M$ to the PFC 14. The duty ratio $D_2$ is equal to a value of the voltage $V_{DC}$ divided the driving voltage $V_M$. That is, $D_2 = V_{DC}/V_M$.

The PFC 14 is configured to calculate a duty ratio $D_1$ based on the digital signal $V_M'$ supplied from the ADC 12 and the current vector $(I_d, I_q)$ supplied from the controller 16, and to supply the duty ratio $D_1$ to the PWM 18a. For example, the PFC 14 calculates the duty ratio $D_1$ using Formula 1.

$$D_1 = \frac{D_1}{z} + \Delta D_1 \quad \text{(Formula 1)}$$

$$\Delta D_1 = \frac{L}{V_M T_S}(\Delta I_d + \Delta I_q) - \left(\frac{V_g}{V_M} - 1\right)$$

The PWM 18a is configured to modulate a pulse width of the duty ratio $D_1$ supplied from the PFC 14 and supply a pulse signal $P_A$ to the boost converter 23.

The PWM 18b is configured to modulate a pulse width of the duty ratio $D_2$ supplied from the controller 16 and supply pulse signals $P_1$-$P_6$ to the 3-phase converter 24.

A configuration of the PFC 14 of FIG. 1 will be described referring to FIG. 3.

The PFC 14 includes a phase angle estimation unit 141, a voltage compensator 142, a first current estimation unit 143, a second current estimation unit 144, a calculator 145, and a mode selector 146.

The phase angle estimation unit 141 is configured to estimate a phase angle variation $\Delta\theta$ of an input voltage to the PFC 14 based on the parameter (current vector $(I_d, I_q)$) supplied from the controller 16 and to supply the phase angle variation $\Delta\theta$ to the first current estimation unit 143.

The voltage compensator 142 is configured to compensate an error of the driving voltage $V_M$ based on the digital signal $V_M'$ supplied from the ADC 12 and to supply a compensated result to the first current estimation unit 143.

The first current estimation unit 143 is configured to estimate a charge current variation $\Delta I_C$ of the charge current that flows to a capacitor in the external device 20 of FIG. 1 based on the compensated result supplied from the voltage compensator 142 and the phase angle variation $\Delta\theta$ supplied from the phase angle estimation unit 141, and to supply the charge current variation $\Delta I_C$ to the calculator 145.

The second current estimation unit 144 is configured to estimate a driving current variation $\Delta I_M$ based on the digital signal $V_M'$ supplied from the ADC 12 and the parameter (current vector $(I_d, I_q)$) supplied from the controller 16, and to supply the driving current variation $\Delta I_M$ to the calculator 145.

The calculator 145 is configured to calculate the duty ratio $D_1$ in which the charge current $I_C$ has a waveform similar to a waveform of the driving voltage $V_M$ based on the charge current variation $\Delta I_C$ supplied from the first current estimation unit 143 and the driving current variation $\Delta I_M$ supplied from the second current estimation unit 144, and to supply the duty ratio $D_1$ to the PWM 18a.

The mode selector 146 is configured to select a current control mode for controlling the charge current $I_C$ or a phase angle estimation mode for estimating a phase angle $\theta$ of the driving voltage $V_M$. Preferably, the mode selector 146 is configured to periodically select the phase angle estimation mode while the current control mode is selected. The phase angle estimation unit 141 is configured to operate when a mode signal (2) for selecting the phase angle estimation mode is supplied to the phase angle estimation unit 141, that is the mode selector 146 selects the phase angle estimation mode for estimating the phase angle $\theta$ of the driving voltage $V_M$.

A configuration of the driver 10 of FIG. 1 will be described referring to FIG. 4.

The phase angle estimation unit 141 includes a phase angle detector 141a, a phase angle measuring unit 141b, a phase angle calculator 141c, and a grid voltage calculator 141d.

The phase angle detector 141a is configured to detect a change position, at which a polarity of the phase angle $\theta$ in a function of the driving voltage $V_M$ changes, based on the duty ratio $D_1$ calculated by the calculator 145. That is, the phase angle detector 141a detects whether a phase angle of the input voltage to the PFC 14 becomes 0° or 90°. More specifically, the phase angle detector 141a adds a constant $\alpha$ ($\alpha>0$) to the duty ratio $D_1$ (an initial value of the duty ratio $D_1$ is equal to 0) supplied from the calculator 145 to calculate an estimated duty ratio $D_1'$ ($D_1' = D_1 + \alpha$). Then the phase angle detector 141a calculates a cyclic driving voltage variation $\Delta V_{Mest}$ ($\Delta V_{Mest} = ((dV_M/dt) - (I_M/C)$, C indicates a capacitance of the capacitor in the external device 20)) based on a variation of the driving voltage $V_M$ per the estimated duty ratio $D_1'$. Then the phase angle detector 141a detects the change position, at which the polarity in a function of the phase angle $\theta$ of the driving voltage $V_M$ changes, based on the cyclic driving voltage variation $\Delta V_{Mest}$. For example, the phase angle detector 141a supplies a reset signal (indicating that the phase angle $\theta$ is equal to 0°) to the phase angle measuring unit 141b when the cyclic driving voltage variation $\Delta V_{Mest}$ changes from negative to positive. Furthermore, the phase angle detector 141a supplies a set signal (indicating that the phase angle $\theta$ is equal to 90°) to the phase angle measuring unit 141b when the cyclic driving voltage variation $\Delta V_{Mest}$ changes from positive to negative. That is, the phase angle detector 141a determines whether the driving voltage $V_M$ changes in a cycle based on a direction (from negative to positive or from positive to negative) in which the polarity in a function of the cyclic driving voltage variation $\Delta V_{Mest}$ changes at the change position.

The phase angle measuring unit 141b is configured to measure the phase angle $\theta$ of the driving voltage $V_M$ based on a detected result (reset signal or set signal) of the phase angle detector 141a and to supply a measured result to the phase angle calculator 141c. More specifically, the phase angle measuring unit 141b includes a counter that is reset or started when the change position is detected by the phase angle detector 141a. In addition, the counter is regularly reset based on a preset input current frequency $F_g$ ($F_g = 1/T_g$).

The phase angle calculator 141c is configured to calculate a difference between a phase angle before measured by the phase angle measuring unit 141b and a phase angle after measured by the phase angle measuring unit 141b as the phase angle variation $\Delta\theta$ ($\Delta\theta = (\theta - \theta/z)$), and to supply the phase angle variation $\Delta\theta$ to the first current estimation unit 143.

The grid voltage calculator 141d is configured to calculate a grid voltage $V_g$ based on the phase angle $\theta$ measured by the phase angle measuring unit 141b and to supply the grid voltage $V_g$ to the calculator 145.

The voltage compensator 142 includes a voltage compensating unit PI. The voltage compensator 142 is configured to calculate an average peak $I_{C\_peak\_ref}$ of the charge current for compensating the error of the driving voltage $V_M$ to a predetermined target driving voltage $V_{M\_ref}$ based on a difference between the digital signal $V_M'$ supplied from ADC 12 and a predetermined the target driving voltage $V_{M\_ref}$, and to supply the average peak $I_{C\_peak\_ref}$ of the charge current to the first current estimation unit 143. The voltage compensator 142 includes a comparatively slow loop in which a feedback is performed every ten cycles in half sine wave of an alternate current, for example, 10 [Hz].

The first current estimation unit 143 is configured to calculate a difference between the charge current $I_C(\Delta\theta)$ corresponding to the phase angle variation $\Delta\theta$ supplied from the phase angle calculator 141c and the average peak $I_{C\_peak\_ref}$ of the charge current supplied from the voltage compensator 142 as a variation $\Delta I_C$ of the charge current.

The second current estimation unit 144 is configured to calculate the driving current from the current vector ($I_d$, $I_q$) supplied from the controller 16, and to calculate a difference between the driving current sensed by the ADC 12 and the driving current calculated on the basis of the current vector ($I_d$, $I_q$) as a variation $\Delta I_M$ ($\Delta I_M = I_M - I_M/z$) of the driving current.

The calculator 145 includes a current compensating unit PI. In an average current mode, the calculator 145 is configured to calculate the duty ratio $D_1$ in which the charge current $I_C$ flowing to the capacitor has the waveform similar to the waveform of the driving voltage $V_M$, and to supply the duty ratio $D_1$ to the phase angle detector 141a and the PWM 18a. In order to generate the charge current $I_C$ in which has a low distortion and a low phase lag, a feedback frequency (for example, 100 [kHz]) and a switching frequency (for example, 100 [kHz]) having comparatively high speed are required. More specifically, the current compensator PI calculates a new duty ratio $D_1$ from an error $\Delta I_{L\_ava\_error}$ between the charge current calculated on the basis of the average peak $I_{C\_peak\_ref}$ and a present driving current, which is equal to the driving current corresponding to the duty ratio $D_1$ one cycle before, on the basis of a sum of the driving current $I_M$.

The mode selector 146 generates the mode signal (1) or (2). When the mode signal (1) is generated, the current control mode for controlling the charge current $I_C$ is performed. When the mode signal (2) is generated, the phase angle estimation mode for estimating the phase angle of the input voltage to the PFC 14. The phase angle estimation unit 141 operates when the mode signal (2) is generated.

Conventionally, it has been required to sense the driving voltage and the driving current in order to improve the power factor. That is, the special sensor for PFC and the signal pass to sense the driving voltage or the driving current have been required. As a result, a circuit area and a consumed power of the driver including the PFC, and a cost of manufacturing the driver have been increased.

On the other hand, according to the embodiment, PFC 14 calculates the duty ratio $D_1$ based on the digital signal $V_M'$ supplied from the ADC 12 and the signal (current vector ($I_d$, $I_q$)) supplied from the controller 16. That is, an application (ADC 12 and controller 16) for monitoring the driving voltage $V_M$ and the driving current $I_M$ is combined with the PFC 14. Therefore, the special sensor for PFC 14 and the signal pass to sense the driving voltage are not substantially required. As a result, a circuit area and a consumed power of the driver 10 including the PFC 14, a cost of manufacturing the driver 10 are reduced.

In addition, in the embodiment, a scope of the present invention is not limited by the phase angle detector 141a that performs a predetermined calculation to determine the cyclic driving voltage variation $\Delta V_{Mest}$. The phase angle detector 141a may use an arcsine table to determine the cyclic driving voltage variation $\Delta V_{Mest}$. In this case, the power factor can be more effectively improved.

In addition, in the embodiment, the scope of the present invention is not limited by the controller 16 that employs FOC (Field Oriented Control).

In addition, in embodiment, the driver 10 may include DSP/MCU (Digital Signal Processor/Micro Controller Unit) having one chip or two chips in which a chip of the PFC 14 is different from a chip of the other modules.

In addition, in embodiment, the scope of the present invention is not limited by the driver 10 that includes the sensor employing three shunts system. For example, the driver 10 may include a sensor employing one shunt system or two shunts system. The driver 10 may be the driver for 3-phase DC motor driver without a brush or AC motor. Furthermore, the driver 10 may be applied to the external device 20 except for the fan.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driver comprising:
   a sensor configured to sense a driving current and a driving voltage for an external device comprising a capacitor;
   a pulse width modulator configured to supply a pulse signal to the external device;
   a power factor corrector comprising a phase angle estimation unit configured to estimate a phase angle variation of an input voltage to the power factor corrector based on a parameter regarding the driving current, a voltage compensator configured to compensate an error of the driving voltage, a first current estimation unit configured to estimate a variation of a charge current flowing to the capacitor based on the charge current for compensating the error by the voltage compensator and the phase angle variation estimated by the phase angle estimation unit, a second current estimation unit configured to estimate a driving current variation, and a calculator configured to calculate a duty ratio for the pulse width modulator based on the variation of the charge current estimated by the first current estimation unit and the driving current variation estimated by the second current estimation unit; and
   a controller configured to control the driving current for the external device and to generate the parameter based on the driving current and the driving voltage sensed by the sensor.

2. The driver of claim 1, wherein the phase angle estimation unit comprises:
   a phase angle detector configured to detect a changing position, at which a polarity in a function of a phase angle of the driving voltage changes, based on the duty ratio calculated by the calculator;
   a phase angle measuring unit configured to measure the phase angle of the driving voltage based on a detected result of the phase angle detector, and a phase angle calculator configured to calculate a difference between phase angles before and after measured by the phase angle measuring unit as the phase angle variation.

3. The driver of claim 2, wherein the phase angle measuring unit comprises a counter configured to be reset or started when the changing position is detected by the phase angle detector.

4. The driver of claim 1, wherein
the controller is configured to control the driving current using a current vector, and
the second current estimation unit is configured to calculate a difference between the driving current sensed by the sensor and a driving voltage on the basis of the driving current variation.

5. The driver of claim 1, further comprising a mode selector configured to select a current control mode for controlling the charge current or a phase angle estimation mode for estimating a phase angle of the driving voltage, wherein
the pulse width modulator is configured to supply the pulse signal having the duty ratio capable of generating a current having a waveform similar to a waveform of the input voltage to the external device when the current control mode is selected by the mode selector, and
the phase angle estimation unit is configured to estimate the phase angle variation when the phase angle estimation mode is selected by the mode selector.

6. The driver of claim 5, wherein the mode selector is configured to periodically select the phase angle estimation mode.

7. The driver of claim 2, wherein
the controller is configured to control the driving current using a current vector, and
the second current estimation unit is configured to calculate a difference between the driving current sensed by the sensor and a driving voltage on the basis of the driving current variation.

8. The driver of claim 7, further comprising a mode selector configured to select a current control mode for controlling the charge current or a phase angle estimation mode for estimating a phase angle of the driving voltage, wherein
the pulse width modulator is configured to supply the pulse signal having the duty ratio capable of generating a current having a waveform similar to a waveform of the input voltage to the external device when the current control mode is selected by the mode selector, and
the phase angle estimation unit is configured to estimate the phase angle variation when the phase angle estimation mode is selected by the mode selector.

9. The driver of claim 8, wherein the mode selector is configured to periodically select the phase angle estimation mode.

10. The driver of claim 3, wherein
the controller is configured to control the driving current using a current vector, and
the second current estimation unit is configured to calculate a difference between the driving current sensed by the sensor and a driving voltage on the basis of the driving current variation.

11. The driver of claim 10, further comprising a mode selector configured to select a current control mode for controlling the charge current or a phase angle estimation mode for estimating a phase angle of the driving voltage, wherein
the pulse width modulator is configured to supply the pulse signal having the duty ratio capable of generating a current having a waveform similar to a waveform of the input voltage to the external device when the current control mode is selected by the mode selector, and
the phase angle estimation unit is configured to estimate the phase angle variation when the phase angle estimation mode is selected by the mode selector.

12. The driver of claim 11, wherein the mode selector is configured to periodically select the phase angle estimation mode.

13. The driver of claim 4, further comprising a mode selector configured to select a current control mode for controlling the charge current or a phase angle estimation mode for estimating a phase angle of the driving voltage, wherein
the pulse width modulator is configured to supply the pulse signal having the duty ratio capable of generating a current having a waveform similar to a waveform of the input voltage to the external device when the current control mode is selected by the mode selector, and
the phase angle estimation unit is configured to estimate the phase angle variation when the phase angle estimation mode is selected by the mode selector.

14. The driver of claim 13, wherein the mode selector is configured to periodically select the phase angle estimation mode.

* * * * *